United States Patent Office 3,578,505
Patented May 11, 1971

3,578,505
PROCESS FOR PREPARING A FUEL CELL ELECTRODE
Edward S. Rogers, Hinsdale, Richard V. Hardin II, Harvey, Benjamin C. Harrison, Hazel Crest, and Robert A. Sanford, Homewood, Ill., assignors to Atlantic Richfield Company
No Drawing. Filed July 8, 1966, Ser. No. 563,685
Int. Cl. H01m 13/00
U.S. Cl. 136—120                                6 Claims

ABSTRACT OF THE DISCLOSURE

A process whereby a catalytically-active metal may be applied to a porous substrate in the preparation of a fuel cell electrode wherein the catalytically-active metal is applied as an aqueous liquid and it is desired to exclude the catalytically-active metal from pores having radii smaller than a predetermined minimum. Particularly, the process comprises blocking the smaller pores with a water-immiscible liquid having a boiling ponit above that of water prior to the treating of the substrate whereby the blocking is accomplished by contacting the porous substrate with the water-immiscible liquid, and then evaporating the water-immiscible liquid from substrate pores having radii larger than the predetermined minimum. The evaporation is conducted so that the water-immiscible liquid remains in substrate pores having radii smaller than the predetermined minimum. Then an aqueous solution of the catalytically-active metal is applied to the porous substrate. Evaporation of the aqueous solution deposits the catalytically-active metal in the substrate pores having radii larger than the perdetermined minimum. Often the porous substrate contains pores of inordinate size and in this case the porous substrate is first treated with an aqueous solution and the largest pores are evacuated. Then the porous substrate is treated with a water-immiscible liquid containing a polymerizable monomer polymerized in said larger pores and decreasing their size accordingly.

---

This invention relates to improved fuel cell electrodes and their method of manufacture. More particularly, the nivention relates to a method of blocking the smaller pores in a porous electrode in order to permit selective impregnation, or coating, of the walls of the larger pores therein.

"Fuel cell" is the common name applied to an electrochemical cell capable of generating electrical energy through electrochemical combustion of a fuel gas with an oxidizing gas. Such cells have been fully described in the literature; however, a brief description of the nature and construction of a fuel cell is helpful in understanding the function and importance of the instant invention.

In general, the simplest fuel cell comprises a housing, two electrodes and an electrolyte which acts as an oxygen transfering medium. An oxidizing gas such as air or other oxidizing gas under elevated pressure is circulated on one side of the oxidizing electrode and a fuel gas such as hydrogen under elevated pressure is circulated on one side of the other electrode. A three phase interface exists at each electrode, i.e., gas, electrolyte and solid, where a process of adsorption, oxidation or reduction, and de-adsorption occurs, generating an electrochemical force.

When current is drained from the electrodes, there is a net flow of electrons from the fuel gas side through an external electrical circuit to the oxidizing gas side. Thus, according to the external electron flow convention, the oxidizing gas electrode is the positive electrode and the fuel gas electrode, the negative electrode. Oxygen is consumed at the positive electrode surface and fuel gas is oxidized into products of combustion at the negative electrode surface. The result is accompanied by release of a portion of the energy of combustion as electrical energy while the remainder is released as heat.

In the most common case, that in which the electrolyte is a liquid, the porous structure of the electrodes becomes important to the successful operation of the fuel cell. Electrodes made of porous solid materials generally provide an environment in which significant surface area is made available to the feul or oxidizer for reaction, i.e., conditions are established which permit the fuel gas or oxidizing gas to pass through the pores of the electrode to the electrode-electrolyte interface. Some of the electrode materials presently in use are silver, nickel, carbon and treated forms of the same. Electrodes can be visualized as being made up of particles of relatively uniform size held together in a random fashion at corners, or along edges, leaving holes between of a size comparable to the particles. The inter-connection of these holes forms a macropore system. In addition, within the particles themselves is an inter-connecting network of smaller pores, the micropore system. The surface area, pore volume, and distribution of pore radii are parameters affecting the performance of electrodes. Control of these parameters can produce useful electrode base materials. For example, carbon electrode blanks with a porous structure having a surface area of about 50–100 m.$^2$/g. and a total pore volume of about 0.3–0.5 cc./g. of which about 15% is in pores of less than 100 A. radius and about 80% is in pores of greater than 2000 A., when promoted with catalyst metals, form electrodes of high activity.

Various difficulties are encountered, however, in operations with electrodes having a broad range of pore radii. Due to capillary attraction, the micropore system in an electrode, e.g., pores having radii less than about 50 A., and often even the smaller macropores, e.g., having radii of about 50–1000 A., may become flooded with electrolyte, the opposing pressure of the fuel or oxidizing gas being insufficient to overcome that of the capillary attraction. This being the case, the catalyst surface area within these small pores does not fully contribute to the activity of the fuel cell and, consequently, catalytic metal present therein is ineffective. Conversely, in the largest macropores, e.g., having radii greater than about 4000 A., capillary attraction may be so small as to be unable to overcome the pressure of the gaseous fuel or oxidant; the surface, therefore, is left dry of electrolyte and also does not contribute adequately to the activity of the cell.

Another factor affecting the activity of a fuel cell is the lessening ability of the gaseous fuel or oxidant to penetrate some of the macropores of smaller size, e.g., from about 50 to 1000 or even 4000 A. radius, after a cell has been operating for a period of time. The surfaces of these smaller macropores, particularly in the fuel gas electrode, tend to become more hydrophilic during the use of the cell which results in the flooding of liquid electrolyte into such pores. This tendency towards hydrophilicity with extended operation of the cell depends in part on the current density of the cell; the greater the current density, the greater the hydrophilic nature of the pores and the wetting thereof. The current density is in turn an inverse function of the degree of polarization of the cell, i.e., as the cell polarizes the current density drops, and with no polarization, the current density remains essentially constant. Therefore, when operating with electrodes which contribute high polariaztion, the current density remains low and the problem of flooding is diminished, but low current densities are antithetic to the objective of a fuel cell which is to operate at as high a current density as is practicable. So in order to operate at high current densities and at the same time discourage flooding, and thereby encourage the penetration of the gases, a wetproofing agent is normally added to the porous electrode. However, the wetproofing is only of value in the macropores and tends to restrict diffusion in the micropores.

There is a need, then, for a method of making a porous fuel cell electrode having catalytically-active metal deposited primarily, or even solely, in the macropore structure of the electrode, and for a method of depositing a wetproofing coating mainly, or even solely, in the macropores. Similarly there is a need for a method of reducing the effective radii of overly large macropores in a porous fuel cell electrode.

We have found that by temporarily blocking the micropore structure of the porous fuel cell electrode with a liquid, the macropores therein may be selectively treated, e.g., by coating or impregnation.

In the case of micropores so small that they will be flooded when in contact with an electrolyte, we have developed techniques enabling us to fill selectively these small pores prior to impregnation with catalyst, and thus exclude the catalyst metal from them. This increases the efficiency, measured as the activity per gram of catalyst metal, of the electrode.

The porous substrate, for example, can first be contacted or filled with a water-immiscible liquid having a boiling point above that of water, preferably greater than about 300° F. Subsequent slow evaporation, e.g., by heating and/or subjecting to a vacuum, can be controlled to leave any desired amount of this liquid in the pores. Since capillary action retains the liquid most tenaciously in the smaller pores, the macropores are the first to be evacuated in descending order of their sizes. When the pores are evacuated which are large enough not to be flooded due to their capillary attraction for the electrolyte, evaporation is ceased and the substrate can then be impregnated with an aqueous solution or a catalyst metal and dried, preferaly at temperatures less than about 220° F. The metal is thus selectively deposited in the larger pores; further heating releases the water-immiscible liquid from the micropores making them free for diffusion of ions through the electrolyte to and from the active surface.

Similarly, in the case of macropores so large as to hold insufficient capillary attraction for the electrolyte to overcome the pressure of the gaseous fuel or oxidant, the effective radii of these pores may be selectively reduced. After saturating the substrate with a water-immiscible liquid and slowly evaporating same to the point that the overly large pores are evacuated, a fine powder of the same material as the substrate, preferably less than ten microns particle size, or of a solid material compatible with the substrate, can be selectively added to these large pores, for example, by air elution of the powder into the base, by flowing a thin slurry of the powder through the base, or by other techniques. The substrate can then be heat-treated at the sintering temperature of the powder to form bonds between the powder particles and the base. Alternatively, if the substrate is a porous metal, after blocking all but the overly large pores, the metal in the form of one of its salts can be deposited from a concentrated aqueous solution in the large pores. The substrate can then be dried and the salt reduced to the free metal.

Considerations governing the choice of the blocking liquid, besides its immiscibility with water, are low viscosity so that it will readily enter the smallest pores, a high enough boiling point that the removal of water during the evaporation of the impregnating solution will be fairly selective, and sufficient thermal and chemical stability that it will neither react with the surfaces or chemicals involved, nor leave a residue on evaporation. Examples of suitable liquids include the hydrocarbons, e.g., cumene, trimethyl benzenes, diethyl benzenes, etc., and the various decane, undecane and dodecane isomers, etc. The invention, of course, is not limited to the use of the above liquids but contemplates the use of various water-immiscible liquids.

The above described techniques may be modified when it is desired to selectively treat the macropores of the substrate with a material which is water-insoluble. This, for example, is usually the case when the macropores need to be coated with a wetproofing agent such as a hydrocarbon wax. As described earlier, unselective treatment of the porous substrate with a wetproofing agent to reduce the hydrophilic properties of the smaller macropores tends to partially clog and restrict diffusion in the micropores. Since the wetproofing is only of value in the macropores, it is again desirable to temporarily block off the micropores while the wetproofing agent is being added. In this case, the substrate can be saturated with water and the water then partially evaporated, as described above for the water-immiscible liquid, leaving the micropore structure blocked, in this case, with water; the larger pores can then be evacuated and made available for deposition of a wetproofing agent therein. The wetproofing agent may be added in solution or dispersion in a water-immiscible solvent, preferably a hydrocarbon solvent such as n-hexane, having a boiling point below that of water; and the deposition of the agent more or less exclusively in the larger pores can then be effected by slowly evaporating, through heating, all of the agent-bearing solvent. Further heating can clear the micropores of the blocking water.

Conversely, if the wetproofing agent is water-soluble or is to be deposited from an aqueous suspension such as, for example, a suspension of polytetrafluoroethylene in water, the aforementioned procedure of blocking the micropores with a water-immiscible solvent may be employed.

Similarly, the problem of overly large macropores, described above, can be eliminated, or at least alleviated, especially if the substrate is a porous carbon, by selectively blocking the smaller pores with water and partially filling the large pores with a solution of an easily polymerized monomer in an organic solvent, and polymerizing the monomer. Suitable monomers include, for instance, ethylenically unsaturated monomers, preferably hydrocarbons, having from 2 to about 7 carbon atoms. These may be deposited from suitable hydrocarbon solvents and polymerization thereof may be brought about, for example, by free radical initiators and anion promoters at temperatures below the boiling point of water, or by gamma radiation at ambient temperatures. Styrene, for example, may advantageously be polymerized at elevated temperatures with the aid of peracetic acid, benzoyl peroxide, t-butyl trifluoroperacetate, or the like. Having selectively formed the polymer in the large pores, the electrode can then be heated in an intert atmosphere to carbonize the additive.

A further variation of the above technique can be performed by treating the porous substrate at elevated temperatures with a liquid organic compound whose molecules are of a size to become entrapped in the smallest pores of the electrode. When heated further, the trapped molecules decompose into a coky residue, while those not trapped escape the surface. Catalyst metal added to such a system is thus excluded from the micropores. On refractory substrates, the coky residue can subsequently be burned off, again leaving the micropores free for diffusion of ions through the electrolyte to and from the active surface.

Porous carbon, if properly utilized, provides an excellent base for fuel cell electrodes. Connecting pores of different sizes provide opportunity for high number of contacts between a liquid and a gas. Carbon electrodes can be used with both acidic and basic electrolytes. Carbon provides a conductor from which free electrons released in the fuel cell reaction can be withdrawn from the cell.

Catalytic promoting metals which may be chemically and/or physically associated with porous structures for use in the production of fuel cell electrodes may include a metal of Groups I–A, I–B, V–B, VI–B, VII–B, and VIII–B of the Periodic Table, e.g., chromium, tungsten, molybdenum, cobalt, nickel, gold, silver, copper, platinum, palladium, rhodium, iridium, other metals such as manganese, and inorganic compounds containing one or more of such metals, e.g., $NiO$, $MnO$, $CoMoO_4$, $V_2O_5$, etc. At the cathode, the noble metals, such as the platinum series metals, and metal oxides, such as combinations of $NiO$ and $LiO$, are preferred. At the anode, the preferred catalysts are cobalt molybdate and once again, metals of the platinum series. Often, these catalytically-active components will be present in the pore structure of the electrode in amounts of about 0.1 to 30% by weight of the substrate.

In accordance with this invention, the porous electrode may be in any suitable shape such as bars, rods, hollow tubes, discs and the like.

The following examples are presented for purposes of illustration only and the details therein should not be construed as limitations upon the scope of the invention.

EXAMPLE I

Ten electrode blanks, one inch in diameter and one-eighth inch thick were cut from a commercially available low surface area carbon rod. They were steam treated with one atmosphere of steam at 1500° F. for fiive hours. One of the ten was then analyzed, yielding the following physical data:

Surface area: 62 square meters per gram.
Total pore volume: 0.36 cubic centimeters per gram.
Pore radii: Less than 100 A.—14% of total volume.
  Greater than 2000 A.—83% of total volume.

The weight loss of the ten electrode blanks due to the steam treatment ranged from 15.2 to 17.1 percent.

The nine remaining blank's were then treated as follows:

Electrode A: One blank, steamed to 15.2% weight loss, was impregnated with an aqueous chloroplatinic acid solution containing 90 mg. Pt/ml. and 0.005% of a surfactant (Igepal CO, an ethoxylated nonylphenol), to aid in wetting the carbon surface. After draining off the excess liquid, the disc was oven dried (4 hours at 220° F.), reduced by immersion in a solution of sodium brohydride containing 8 ml. of 12% $NaBH_4$ in caustic solution and 24 ml. of deionized water, and then exhaustively washed, first with methanol, then with water. The finished, dried electrode analyzed 3.15% Pt, by weight.

Electrode B: A second blank, steamed to 16.6% weight loss was treated in identical fashion as Electrode A. The finished electrode analyzed 3.20% Pt, by weight.

The remaining electrode blanks were weighed, saturated with cumene and re-weighed; they were then held under vacuum (1 mm. Hg) at room temperature until a portion of the cumene had evaporated, capillarity holding the remaining liquid in the smallest pores. These were then treated as follows:

Electrode C: A blank, steamed to 16.0% weight loss, having the smallest 44%, based on total pore volume, of its pores (or, alternatively, the smallest 42% of its pores plus a monolayer of liquid covering the balance of the surface) filled with cumene, was impregnated with aqueous chloroplatinic acid solution containing 90 mg. Pt/ml. and 0.005% of Igepal CO, and reduced and washed as described for Electrode A above. The finished, dried electrode analyzed 1.60% Pt, by weight.

Electrode D: A blank, steamed to 16.9% weight loss, and having the smallest 27% of its pores (or the smallest 24% plus a monolayer of liquid covering the rest of the surface) filled with cumene, was impregnated with the same $H_2PtCl_6$ solution, reduced, washed and dried, using the method described for Electrode #A. The finished electrode analyzed 2.26% Pt. by weight.

The remaining five electrode blanks were treated in the same fashion; description of the finished electrodes are tabulated below:

| Electrode | Weight loss, percent | Pores blocked with cumene [1] | Catalyst concentration [2] |
|---|---|---|---|
| E | 15.6 | 25 | 2.40 |
| F | 16.8 | 32 | 2.02 |
| G | 16.8 | 17 | 2.54 |
| H | 17.0 | 26 | 2.28 |
| I | 16.9 | 25 | 2.35 |

[1] Percent of total pore volume.
[2] Weight percent of Pt.

Electrodes A through E were wetproofed by the addition of 1 percent wax, based on the weight of the electrode, using a solution of a high melting point hydrocarbon wax in hexane. They were then tested as fuel electrodes in a hydrogen-oxygen fuel cell at 160° F. using 5 N $H_2SO_4$ as the electrolyte and a one inch electrolyte gap. The following polarization characteristics were observed:

| Electrode | Pores blocked with cumene, percent | Polarization at current density, mv. | | | |
|---|---|---|---|---|---|
| | | 20 A./ft.[2] | 50 A./ft.[2] | 100 A./ft.[2] | 20 A./ft.[2] |
| A | 0 | 15 | 27 | 39 | ([1]) |
| B | 0 | 15 | 23 | 40 | ([1]) |
| Avg. A and B | ([1]) | 15 | 25 | 40 | 2 7 b |
| C | 44 | 7 | 16 | 31 | 2 0 b |
| D | 27 | 0 | 8 | 21 | 46 |
| E | 25 | 0 | 7 | 20 | 46 |

[1] No equilibrium data obtained.
[2] Estimated.

Thus, it is apparent that electrodes prepared according to the process of the invention are less expensive than those prepared by the prior art methods, in that they employ less precious metal catalyst. Surprisingly though, the electrodes of this invention are also greatly improved over electrodes not so prepared in that they show much lower polarization (electrode resistance) especially at conditions of low current drain, and a considerable increase in peak power capacity.

EXAMPLE II

The pore-blocking technique of the present invention, as stated above, is an effective means for selectively depositing polymerizable monomers only in the extremely large pores of a substrate. The monomers may then be polymerized while in the pores and the resultant polymers carbonized, thereby effecting a reduction in the radii of the overly large pores.

A porous carbon disc similar to those of Example I, but having an undesirably large percentage of its pore volume in very large pores (85% in pores having radii greater than 50,000 A.), is saturated with deionized water so as to fill substantially all of the pores therein. The water is then slowly evaporated at room temperature by subjecting the disc to house vacuum (about 28 inches Hg) until 85% of the water is removed, leaving water in the smallest 15% of the pores. The disc is then impregnated at 10–15° C. by immersion in a solution of 0.1%, by weight, of benzoyl peroxide in styrene, thereafter drained and blotted on absorbent paper to remove excess impregnating solution. The impregnated disc is then encapsulated to prevent evaporation of the liquids, and heated to 80° C. for a period of three hours to polymerize the styrene in the pores of the disc. The capsule is next vented and heated to 1000° F. for three hours, transforming the polystyrene into a coky residue. The following physical changes in the pore structure of the carbon disc result from this treatment:

|  | Before | After |
|---|---|---|
| Weight of disc, gms | 1.83 | 2.36 |
| Surface area, m.²/gm | 25 | 43 |
| Total pore volume, cc./gm | 0.43 | 0.3 |
| Percent of volume in pores of radius less than 1,000 A | 6 | 10 |
| Percent of volume in pores of radius from 1,000 to 10,000 A |  | 20 |
| Percent of volume in pores of radius greater than 50,000 A | 85 | 30 |

Thus it is seen that blocking of the small pores with water allows for the subsequent reduction of the radii of the overly large pores, through monomer deposition, polymerization and coking, without the disadvantage of reducing the pore radii of, or completely closing, the desirable small pore structure.

The determination as to which pores are to be blocked and which are to be left open for impregnation, coating, pore size reduction, etc., depends on the desired use of the electrode, the electrolyte to be employed, the amount of catalyst, wetproofing agent, etc., to be deposited, the pressure and nature of the fuel and oxidant to be used, the particular electrode substrate utilized, and so on. Generally, however, it will be desirable to preclude catalyst and wetproofing agent from those pores having radii of about 50 A. or less, and from most, e.g., at least about 80% of the pore volume therein, of those pores having radii from about 50 to 1000 A. The overly large pores, i.e., those which hold little or no capillary attraction for the electrolyte, usually will be those pores having radii greater than about 4,000 A. Thus, depending on the particular deposition or impregnation to be effected, the demarcation pores size, i.e., that pore radius below which pores will be blocked, can lie anywhere in the range from about 50 to 4000 A.

It is claimed:

1. A process in the preparation of a fuel cell electrode having a porous substrate containing pores having radii larger than of a predetermined size of from about 50 to 4,000 A. and radii smaller than of the predetermined size wherein a catalytically-active metal is deposited primarily in the pores having radii larger than of the predetermined size, said process comprising:
    (a) contacting the porous substrate with a water-immiscible liquid having a boiling point above that of water,
    (b) evaporating said water-immiscible liquid from substrate pores having radii larger than of the predetermined size,
    (c) ceasing said evaporation to leave the said water-immiscible liquid in substrate pores having radii smaller than of the predetermined size, thereby blocking said smaller pores,
    (d) contacting the porous substrate with an aqueous solution of catalytically-active metal,
    (e) drying said porous substrate thereby depositing said catalytically-active metal in the pores having radii larger than of the predetermined size,
    (f) heating the porous substrate thereby evaporating the water-immiscible liquid from the pores having radii smaller than of the predetermined size.

2. The process of claim 1 wherein the water-immiscible liquid has a boiling point greater than about 300° F.

3. The process of claim 2 wherein the water-immiscible liquid is a hydrocarbon.

4. The process of claim 1 wherein the porous substrate consists essentially of carbon.

5. The process of claim 1 wherein the catalytically-active metal is a platinum series metal.

6. In the process of preparing a fuel cell electrode by impregnating a porous carbon substrate with a catalyst containing a platinum series metal wherein said catalyst is applied in an aqueous liquid and said catalyst is excluded from pores having radii smaller than of a predetermined size of from about 50 to 1,000 A., the improvement which comprises saturating the carbon substrate with a liquid hydrocarbon having a boiling point greater than about 300° F., evaporating said hydrocarbon from substrate pores having radii larger than of the predetermined size, ceasing said evaporation to leave said hydrocarbon in substrate pores having radii smaller than of the predetermined size, contacting the porous substrate with an aqueous solution of the catalytically active metal, drying said porous substrate thereby depositing said catalytically-active metal in the pores having radii larger than of the predetermined size, and heating the porous substrate thereby evaporating the liquid hydrocarbon from the pores having radii smaller than of the predetermined size.

References Cited

UNITED STATES PATENTS

| 3,098,762 | 7/1963 | Roblee, Jr., et al. | 117—213 |
| 3,310,434 | 3/1967 | Kordesch | 136—120 |
| 3,335,034 | 8/1967 | Laurent et al. | 136—120 |
| 3,423,247 | 1/1969 | Darland, Jr., et al. | 136—120 |
| 3,438,815 | 4/1969 | Giner | 136—120X |

WINSTON A. DOUGLAS, Primary Examiner

O. F. CRUTCHFIELD, Assistant Examiner

U.S. Cl. X.R.

117—213; 136—121, 122